UNITED STATES PATENT OFFICE.

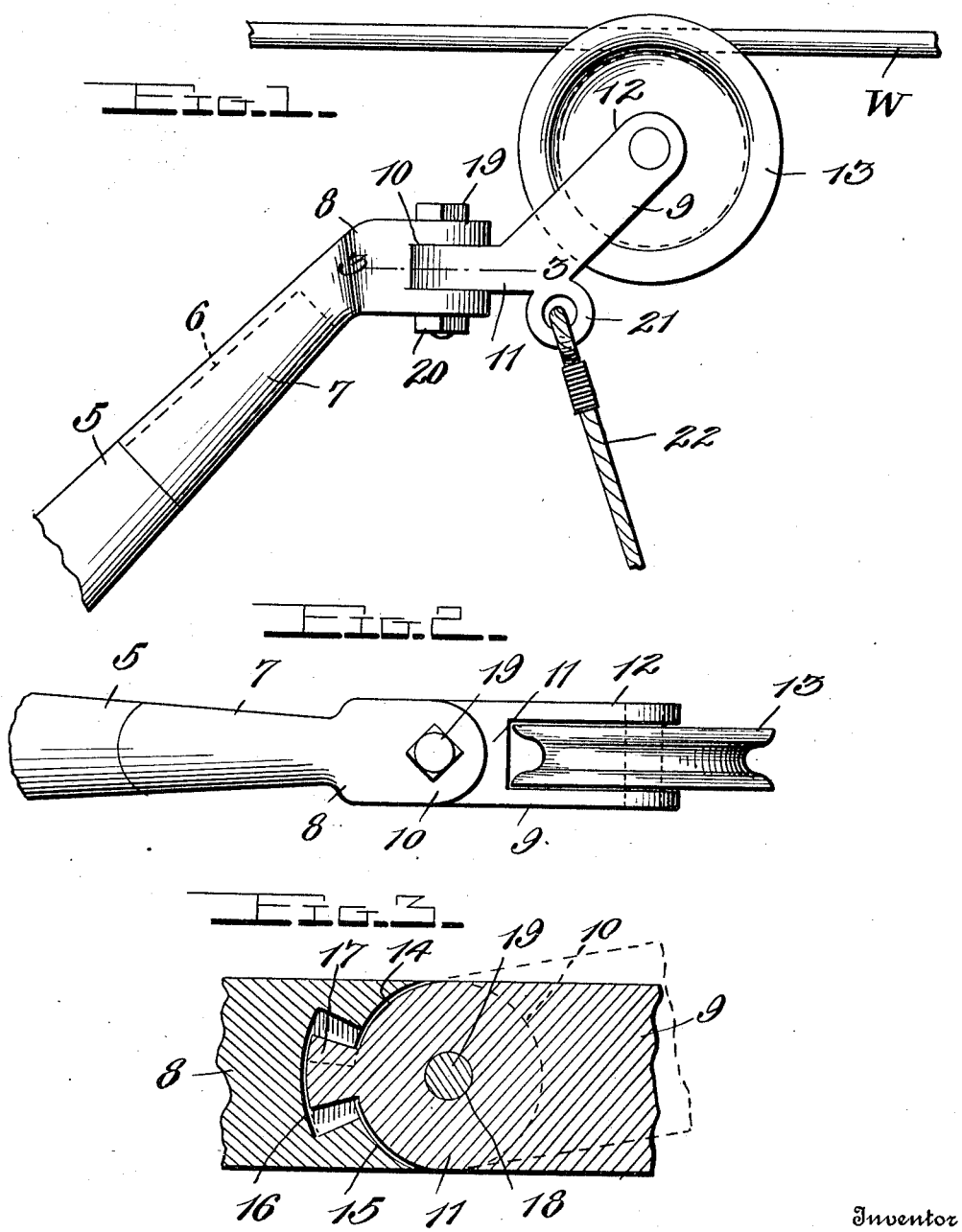

PETER JACOB ADOLPH SCHNOOR, OF HOLSTEIN, IOWA.

TROLLEY.

1,019,848.  Specification of Letters Patent.  Patented Mar. 12, 1912.

Application filed September 18, 1911. Serial No. 649,870.

*To all whom it may concern:*

Be it known that I, PETER JACOB ADOLPH SCHNOOR, a citizen of the United States, residing at Holstein, in the county of Ida and State of Iowa, have invented certain new and useful Improvements in Trolleys, of which the following is a specification, reference being had to the accompanying drawings.

This invention relates to trolleys and more particularly to improved means for mounting the trolley head or harp upon the end of the trolley pole so as to enable the harp and the wheel carried thereby to turn freely in rounding curves so as to eliminate the liability of the wheel leaving the conducting wire.

A further object of the invention is to provide a very simple means for mounting the trolley head or harp in which the wheel is arranged whereby the same has limited pivotal movement in a lateral direction.

With the above and other objects in view, the invention consists of the novel features of construction, combination and arrangement of parts hereinafter fully described and claimed, and illustrated in the accompanying drawings, in which—

Figure 1 is a side elevation of a trolley head or harp and the wheel mounted therein showing the same arranged upon the upper end of the trolley pole; Fig. 2 is a top plan view; and Fig. 3 is a section taken on the line 3—3 of Fig. 1.

Referring in detail to the drawings 5 designates the trolley pole which is provided upon its upper end with a reduced tapering extension 6 to receive the tubular portion 7 of an arm 8. Upon the supporting arm 8, the trolley head or harp 9 is mounted, the body portion of said arm being horizontally disposed and longitudinally bifurcated as indicated at 10. Between the spaced portions of the arm formed by this bifurcation, the horizontal extension 11 of the trolley harp 9 is disposed. The spaced arms 12 of the harp between which the conducting wheel 13 is rotatably mounted, extend upwardly at an angle with relation to the body portion 11 thereof. The end of the body 11 is rounded as indicated at 14, and the opposed wall 15 of the arm 8 at the inner end of the bifurcation 10 is disposed in concentric relation thereto. The arm 8 is further provided with an arcuate recess 16 which extends transversely thereof and opens into the space provided in said arm by the bifurcation 10. Upon the rounded end 14 of the trolley head or harp 9 and extending longitudinally therefrom, a lug 17 is formed. This lug is disposed within the recess 16 of the arm 8 when the parts are assembled and is adapted to limit the lateral pivotal movement of the harp 9 upon the supporting arm. The body 11 of the harp is provided with a vertically extending opening 18 to receive the pivot bolt 19 which extends through the parallel spaced portions of the supporting arm. A securing nut 20 is threaded upon the lower end of this pivot bolt and retains the parts in their assembled positions.

The end walls of the recess 16 extend radially from the pivot 19 and with these end walls of the recess the radially extending side edges of the lug 17 are adapted to engage in the pivotal movement of the harp or head as clearly shown in dotted lines in Fig. 3. Upon the trolley harp 9 an eye 21 is formed to receive the rope 22 whereby the wheel 13 may be disengaged from the current conducting wire W by pulling the pole down upon the top of the car in the usual manner.

From the foregoing it is thought that the construction and manner of operation of my improved trolley will be fully understood. The parts may be easily and quickly assembled and by pivotally mounting the harp upon the end of the pole, the same may move independently of the pole when the car rounds a curve so that it will follow the conducting wire and not be disengaged therefrom. The device is simple, effective in practical operation and may be manufactured at a comparatively small cost. By providing the stop lug 19 the abnormal movement of the harp with relation to the pole is prevented while at the same time there is sufficient movement of the harp for the accomplishment of the desired purpose.

While I have shown and described the preferred construction and arrangement of the various parts, it will be understood that the device is susceptible of considerable modification without departing from the essential feature or sacrificing any of the advantages thereof.

Having thus described the invention what is claimed is:—

The combination with a trolley pole, of a supporting arm rigidly fixed to the upper end of said pole and including a horizontally disposed longitudinally bifurcated body portion, a harp having upwardly extending angularly disposed parallel wheel carrying arms, said harp also having a horizontally disposed body portion to be received in the bifurcated body of said supporting member, the end of the body of said harp and the inner wall of the bifurcation in said body member being respectively convex and concave and concentrically disposed, a pivot bolt connecting the parallel arms formed by the bifurcation in the body member and extending through the horizontal portion of the harp, the body of said supporting member being further provided with a transversely extending arcuate recess having its end walls radially disposed with relation to said pivot bolt, said recess opening into the space between the arms of said supporting member, the body of said harp having a stop lug integrally formed thereon and projecting into the recess of the supporting member, the side faces of said lug being radially disposed with relation to the pivot of the harp and adapted to coact with the end walls of said recess to limit the pivotal movement of the harp upon said supporting member.

In testimony whereof I hereunto affix my signature in the presence of two witnesses.

PETER JACOB ADOLPH SCHNOOR.

Witnesses:
GLEN M. GRACEY,
A. N. BERTELSEN.

---

Copies of this patent may be obtained for five cents each, by addressing the "Commissioner of Patents, Washington, D. C."